United States Patent [19]
Kuebler et al.

[11] Patent Number: 5,702,785
[45] Date of Patent: Dec. 30, 1997

[54] ELASTIC SEALING FOIL

[75] Inventors: Markus Kuebler, Bad Liebenzell; Peter Hofmann, Neuhausen, both of Germany

[73] Assignee: Dr. Ing. h.c.F. Porsche AG, Germany

[21] Appl. No.: 426,800

[22] Filed: Apr. 24, 1995

[30] Foreign Application Priority Data

Apr. 23, 1994 [DE] Germany .................. P 44 14 302.8

[51] Int. Cl.⁶ .................................................. B60R 11/02
[52] U.S. Cl. ...................... 428/35.2; 428/122; 428/358
[58] Field of Search ................ 428/80, 122, 358, 428/35.2

[56] References Cited

U.S. PATENT DOCUMENTS

| | | | |
|---|---|---|---|
| 2,208,445 | 7/1940 | Bates | 428/9 |
| 3,149,017 | 9/1964 | Ehrreich et al. | 428/12 X |
| 4,281,224 | 7/1981 | Castagna | 181/150 X |
| 4,469,732 | 9/1984 | Isaksen et al. | 428/80 |
| 4,588,627 | 5/1986 | Isaksen et al. | 428/80 |
| 4,604,302 | 8/1986 | Isaksen et al. | 428/80 X |
| 4,634,395 | 1/1987 | Burchett | 428/12 X |
| 4,696,848 | 9/1987 | Jones et al. | 428/80 |
| 4,873,132 | 10/1989 | Jones et al. | 428/80 |
| 4,957,803 | 9/1990 | Foley | 428/80 X |
| 5,446,999 | 9/1995 | Inaba et al. | 49/502 |
| 5,482,343 | 1/1996 | Bradac | 428/80 X |

*Primary Examiner*—Henry F. Epstein
*Attorney, Agent, or Firm*—Evenson, McKeown, Edwards & Lenahan, P.L.L.C.

[57] ABSTRACT

According to the invention, an elastic sealing foil for an inside door panel of a motor vehicle door is formed to provide a receiving device which can be changed from a manufactured position into an installed position. In the manufactured position, the receiving device is composed of two formed-out portions which are arranged above one another, have a cross-section with an approximately U-shaped profile and extend in the opposite directions. These formed-out portions are connected to one another by way of a common wall section. In the installed position, the receiving device projects through an opening of the inside door panel, and downward into the hollow space of the door body, and envelopes an audio or accessory part inserted into the receiving device, providing a water-tight seal with respect to the hollow space of the door body. The receiving device can be displaced from its manufactured position into its installed position by applying an outwardly and downwardly directed force to the lower formed-out portion.

16 Claims, 2 Drawing Sheets

ELASTIC SEALING FOIL

BACKGROUND AND SUMMARY OF THE INVENTION

This invention relates to an elastic sealing foil for an inside door panel of a motor vehicle door, which foil is formed to provide a receiving device which is unitary therewith, and which can be changed from a manufactured position into an installed position. In the installed position, it projects through an opening in the inside door panel, and at least a portion of it encloses an audio or accessory part inserted therein, providing a water tight seal which separates it from the interior hollow space of the door body.

A known elastic sealing foil of this generic mentioned type is disclosed in U.S. Pat. No. 4,873,132. It provides a one-piece receiving device for an audio or accessory part which is formed of the sealing foil, and which can be displaced from a manufactured position to an installed position. In the manufactured position, the receiving device comprises a circular bottom wall which is connected with the sealing foil by several corrugated sections extending concentrically with respect to the bottom wall. In the manufactured position, the bottom wall of the receiving device extends in the plane of the sealing foil, and the corrugated sections protrude slightly.

By the application of manual force on the circular bottom wall in the direction of the exterior side of the vehicle, the receiving device is moved into its approximately truncated-cone-shaped installed position, in which it envelopes a built-in loudspeaker in sections, and seals it off in a watertight manner toward the interior of the door body. The receiving device has its largest cross-section in the area of the opening of the inside door panel, the cross-section being continuously reduced in the direction of the bottom wall or toward the hollow space of the door body.

This arrangement has the disadvantages that the manufacture of the receiving device with the concentric corrugated sections requires high expenditures, and that the receiving device has a relatively small volume because it utilizes only the area of the hollow space of the door body situated directly behind the opening.

It is an object of the present invention to provide a receiving device for an audio or accessory part, which is constructed in one piece with an elastic sealing foil.

Another object of the invention is to provide such a receiving device that can be manufactured in a simple manner and at reasonable cost. Yet another object of the invention is to provide a receiving device which utilizes a greater portion of the space existing within the hollow space of the door body to enlarge the volume of the receiving device.

These and other objects and advantages are achieved by the receiving device according to the invention, which in the manufactured condition consists of two formed portions which are arranged above one another, have a cross-section of an approximately U-shaped profile, and extend in opposite directions. This receiving devices can be manufactured in a simple manner and at reasonable cost, because the formed portions extend in the molding-out direction of the tool. By manually reversing the lower formed portion, which faces the exterior side of the vehicle with its open side, and a downward pressing of this inverted area, the receiving device can be moved into its installed position, in which it achieves a significant volume enlargement because it projects downward beyond the opening of the inside door panel, and optimally utilizes the space formed between the window pane and the inside door panel.

Other objects, advantages and novel features of the present invention will become apparent from the following detailed description of the invention when considered in conjunction with the accompanying drawings.

DETAILED DESCRIPTION OF THE DRAWINGS

Figure 1:
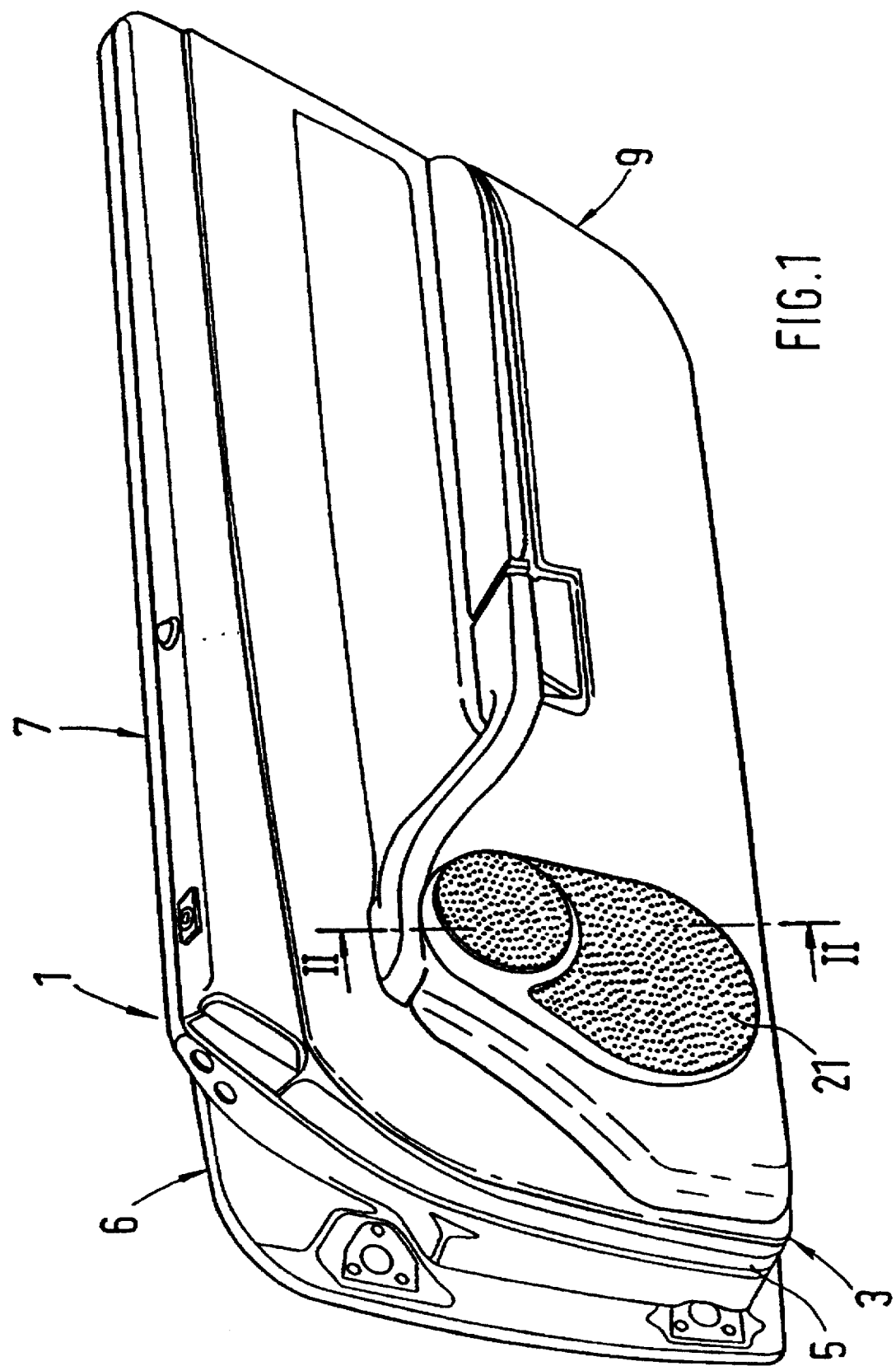
FIG. 1 is a perspective view of the interior side of a motor vehicle door.
Figure 2:
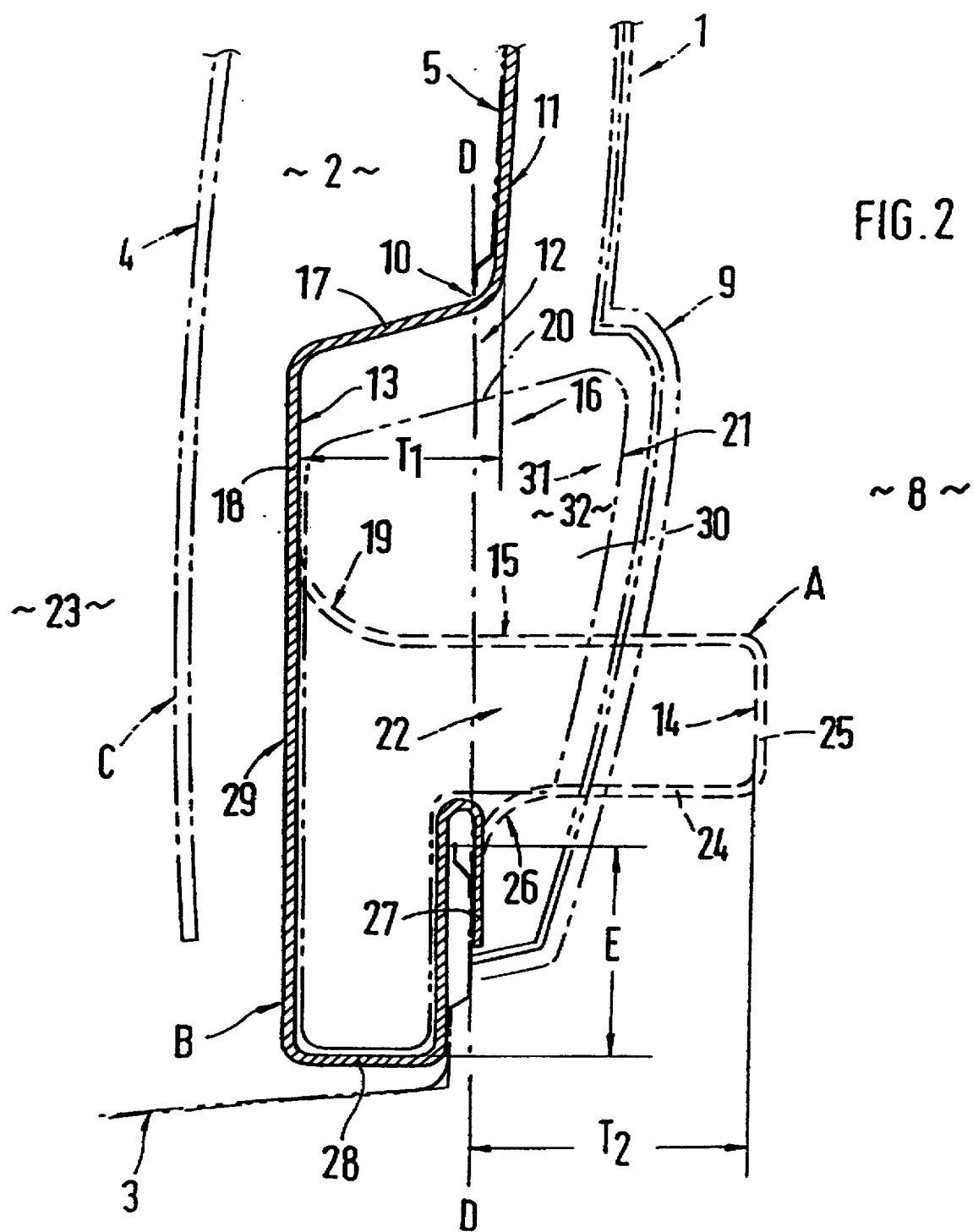
FIG. 2 is an enlarged sectional view taken along Line II—II of FIG. 1.

As shown in FIGS. 1 and 2 a motor vehicle door 1 comprises a door body 3 forming a hollow space 2 in which a window pane 4, which can be adjusted in the vertical direction, is accommodated in its lowered position C. The door body 3 comprises an inside door panel 5 and an outside door panel 6 which are locally connected with one another at their edges. In the embodiment shown, the motor vehicle door 1 is constructed without a frame above a belt line 7.

On the side facing the passenger compartment 8, the door body 3 is provided with a covering 9 which is detachably fastening on the inside door panel 5 by means of screws, clips or the like (not shown).

For mounting purposes the inside door panel 5 has openings 10, with at least the area of such openings 10 being covered by a large-surface thin elastic sealing foil 11 manufactured of a suitable plastic material, such as polyethylene or the like. The sealing foil 11 is fastened to the side of the inside door panel 5 facing the passenger compartment 8 by means of a surrounding adhesive bead at its edges.

The sealing foil 11 is formed in such a manner as to provide at least one receiving device 12 which is integral therewith, and which can be displaced from a manufactured position A into an installed position B. In the manufactured position A, the receiving device 12 is composed of two formed portions 13,14 which are arranged above one another, each having an approximately U-shaped profile (viewed in the cross-sectional direction), and extending in opposite directions. The two formed portions 13, 14 are connected by a common wall section 15 which, according to FIG. 2, is aligned approximately horizontally. This arrangement is produced by hot-stamping the sealing foil 11 by means of a forming tool.

The upper formed portion 13 projects through the opening 10 of the inside door panel 5 into the hollow space 2 of the door body 3, with the open (concave) side 16 of the formed portion 13 facing the passenger compartment 8. Viewed from the passenger compartment 8, the formed portion 13 is approximately trough-shaped; it comprises an upper diagonally extending wall 17, a vertical wall 18 and a partial area of the common wall section 15. Toward the front and rear, the formed portion 13 is closed by transversely extending, vertical wall sections (not shown).

The wall 18 extends in the longitudinal direction, at a distance $T_1$ from the contour of the sealing foil 11. The measurement $T_1$ thus defines the position of a vertical wall 29 of the receiving device or receptacle 12, which faces the hollow space 2 of the door body 3, in the installed position B.

The approximately horizontal wall section 15 is connected to the vertical wall 18 by a rounded transition area 19. The diagonally extending wall 17 extends approximately in parallel and at a distance from an upper boundary 20 of an audio or accessory part 21 inserted into the receiving device 12.

The lower formed portion 14 adjoins the common wall section 15 and extends in the direction of the passenger compartment 8, the open (concave) side 22 of the formed portion 14 facing the exterior side 23 of the vehicle. In the manufactured position A, the formed portion 14 would theoretically project beyond the covering 9 in the direction of the passenger compartment 8. Viewed from the passenger compartment 8, it is also trough-shaped, and comprises the upper wall section 15, a lower wall section 24 and an approximately vertical connection wall 25. Toward the front and rear, the trough-shaped formed portion 14 is closed by vertical transverse walls (not shown). The lower wall section 24 is connected to an end fastening area 27 of the sealing foil 11 by means of a rounded transition area 26.

The receiving device 13 can be placed in its installed position B by applying an outwardly and downwardly directed force onto the lower formed portion 14, which causes a reversal of the lower formed portion 14. Manipulated in this manner, the receiving device 12 will extend downward beyond the opening 10 of the inside door panel 5 so that at least a section of it rests against the side of the inside door panel 5 which faces the hollow space 2. In the installed position B, it thus extends inside the hollow space 2 of the door body 3, and reaches over the opening in the downward direction by the extent E.

In the manufactured position B, the two formed portions 13, 14 are aligned approximately perpendicular to a vertical auxiliary plane D-D, and are designed such that a removal from the forming tool is easy.

The depth $T_2$ of the lower formed portion 14 defines the extent E to which the receiving device 12 projects downward beyond the opening 10 of the inside door panel 5.

When the receiving device 12 is displaced from its manufactured position A into the installed position B, the lower, approximately horizontal wall section 24 of the lower formed portion 14 is moved so that it rests below the opening 10 with its interior side adjacent the side with the inside door panel 5 which faces the hollow space 2, as shown in FIG. 2. In the installed condition B, the connection wall 25 of the lower formed portion 14 forms, in a reversed configuration, a bottom wall 28 of the receiving device 12; and the wall section 15, which is horizontal in the manufactured position A, forms a vertical wall 29 between the wall 18 and the bottom wall 28, with the walls 18 and 29 now extending in a common, approximately vertical plane.

In this embodiment, the audio or accessory part 21 has a sound box 30 which comprises an outer housing and an interior loudspeaker. The sound box 30 is inserted into the receiving device 12 through the opening 10. In the lower area, the sound box 30 is slightly narrower than the receiving device 12. In the area of the opening 10, it has a larger depth, a with section 31 projecting into the space 32 formed between the inside door panel 5 and the covering 9, and is held in position on the inside door panel 5 or on the covering 9 by means of fastening elements (not shown). Alternatively, the audio or accessory part 21 may also be a loudspeaker, an ash tray, a receptacle or the like.

The receiving device 12 constructed on the sealing foil 11 envelopes the inserted audio or accessory part 21 in the installed position B at least in sections, and provides an air-tight and water-tight seal which separates it from the hollow door space 2.

The longitudinal dimension of the receiving device 12 depends on the size of the audio or accessory part 21 to be installed. Below the opening 10, it has a greater depth than in the area of the opening 10 because, in the area of the opening 10, the space extending between the inside door panel 5 and the covering 9 can also be utilized as a receiving device.

Although the invention has been described and illustrated in detail, it is to be clearly understood that the same is by way of illustration and example, and is not to be taken byway of limitation. The spirit and scope of the present invention are to be limited only by the terms of the appended claims.

What is claimed is:

1. An a arrangement for receiving an accessary part in an inside panel of a vehicle door, comprising:

an elastic sealing foil which is formed into a receptacle that can be inserted in an opening in said inside panel;

said receptacle being displaceable from a manufactured position into an installed position in which it projects through the opening of the inside door panel into an interior hollow space of a door body of said vehicle door and is disposed to envelope an accessory part inserted therein, providing a watertight seal between said accessory part and said hollow space of the door body;

in said manufactured position said receptacle comprises upper and lower formed portions of the sealing foil which are arranged above one another, each of said upper and lower formed portions having an approximately U-shaped cross-sectional profile, and extending in opposite directions, the formed portions sharing a common wall section;

in said installed position, the receptacle extends downward beyond the opening of the inside door panel, with at least a section thereof resting on a side of the inside door panel which faces the hollow space; and said receptacle being displaceable between said manufactured position and said installed position by an outwardly and downwardly directed force applied to the lower formed portion.

2. The arrangement according to claim 1 wherein in the manufactured position, a portion of the upper formed portion projects into the hollow space of the door body and, an open side of said formed portion faces the passenger compartment.

3. The arrangement according to claim 2 wherein a measurement $T_1$ of the upper formed portion defines, in the installed position, the position of a vertical wall of the receiving device facing the hollow space of the door body.

4. The arrangement according to claim 1 wherein a measurement $T_1$ of the upper formed portion defines, in the installed position, the position of a vertical wall of the receiving device facing the hollow space of the door body.

5. The arrangement according to claim 1 wherein in the manufactured position, the lower formed portion extends in the direction of the passenger compartment and its open side faces the exterior side of the vehicle.

6. The arrangement according to claim 5 wherein in the manufactured position, the two formed portions are aligned approximately perpendicular to a vertical auxiliary plane D—D.

7. The arrangement according to claim 5 wherein a depth $T_2$ of the lower formed portion determines an extent E to which the receiving device projects downward beyond the opening of the inside door panel.

8. The arrangement according to claim 1 wherein in the manufactured position, the two formed portions are aligned approximately perpendicular to a vertical auxiliary plane D—D.

9. The arrangement according to claim 1 wherein;

a lower, approximately horizontally extending wall section of the lower formed portion, in the installed position of the receiving device, on the side facing the hollow space, below the opening, rests on the inside door panel;

a connection wall of the lower formed portion 14 in the installed position forms a bottom wall of the receiving device; and the wall section, which is approximately horizontal in the manufactured position, forms a vertical wall between the longitudinal wall and the horizontal bottom wall in the installed position.

10. The arrangement according to claim 1 wherein said accessory part is a built-in loudspeaker.

11. The arrangement according to claim 1 wherein the accessory part is a sound box which can be fastened to the inside door panel.

12. An arrangement for receiving an accessary part in an inside panel of a vehicle door, comprising:

an elastic sealing foil which is formed into a receptacle having a shape that can be inserted in an opening in said inside panel;

said receptacle being displaceable from a manufactured position into an installed position in which it projects through the opening of the inside door panel into an interior hollow space of a door body of said vehicle door and is disposed to envelope an accessory part inserted therein, providing a watertight seal between said accessory part and said hollow space of the door body;

in said manufactured position said receptacle comprises upper and lower formed portions of the sealing foil which are arranged above one another, each of said upper and lower formed portions having an approximately U-shaped cross-sectional profile, and extending in opposite directions, the formed portions sharing a common wall section; and in said installed position, the receptacle extends downward beyond the opening of the inside door panel, with at least a section thereof resting on a side of the inside door panel which faces the hollow space.

13. An elastic sealing foil for forming a receptacle for receiving an accessory part inserted into an interior hollow space of a vehicle door through an opening in an inside panel of said vehicle door, said elastic sealing foil comprising:

a first formed portion; and a second formed portion;

said first and second formed portions being disposed adjacent one another, each having an elongated concave cross section, with an opening of said concave cross section of said first formed portion facing toward an exterior of said vehicle door and an opening of said concave cross section of said second formed portion facing toward an interior of said vehicle door, said first and second formed portions sharing a common wall section; and said first formed portion being displaceable relative to said second formed portion, both in an outward direction, and in a lateral direction which is substantially perpendicular to said outward direction, into an installed position of said sealing foil, wherein said first formed portion projects through said hole into said interior hollow space of said vehicle door, and extends laterally to fill an area of said hollow space beyond an area adjacent to said opening, with said common wall section disposed adjacent an exterior portion of said vehicle door.

14. An arrangement for receiving an accessory part in an inside panel of a vehicle door, comprising:

an elastic sealing foil which is formed into a receptacle that can be inserted in an opening in said inside panel;

said receptacle being displaceable between first and second stable configurations; wherein said first stable configuration comprises a manufactured position of said receptacle in which upper and lower formed portions of the sealing foil are arranged above one another, each of said upper and lower portions having an approximately U-shaped cross sectional profile with an open end and a closed end, the open ends being oriented in opposite directions, whereby the formed portions share a common wall section;

said second stable configuration comprises an installed position of said receptacle in which said U-shaped cross section of said lower formed portion is turned inside out relative to said first stable configuration, thereby forming an opening of said receptacle which corresponds in size and shape to said opening of said inside panel, said lower formed portion projecting downward beyond said opening of said receptacle, whereby in said installed position said receptacle projects through the opening of the inside door panel into an interior hollow space of a door body of said vehicle door, with at least a portion thereof resting on a side of the inside door panel which faces the hollow space of said door body.

15. The arrangement according to claim 14 wherein in said first stable configuration said U-shaped lower portion extends approximately perpendicularly to a position of said lower portion in said second stable configuration.

16. The arrangement according to claim 14 wherein said receptacle is displaceable between said first stable configuration and said second stable configuration in response to an outwardly and downwardly directed force applied to the lower formed portion.

* * * * *